(12) United States Patent
Kato et al.

(10) Patent No.: US 6,295,969 B1
(45) Date of Patent: Oct. 2, 2001

(54) INJECTOR MOUNTING ARRANGEMENT FOR DIRECT-INJECTED ENGINES

(75) Inventors: Masahiko Kato; Takayuki Sato, both of Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/440,441

(22) Filed: Nov. 15, 1999

(30) Foreign Application Priority Data

Nov. 13, 1998 (JP) .................................................. 10-323256

(51) Int. Cl.$^7$ .................................................. F02M 55/02
(52) U.S. Cl. .................................... 123/470; 123/41.31
(58) Field of Search .................................. 123/468, 470, 123/469, 41.31

(56) References Cited

U.S. PATENT DOCUMENTS

| | | | |
|---|---|---|---|
| 3,841,277 | * 10/1974 | Schafer ................................. | 123/470 |
| 3,941,109 | * 3/1976 | Schmid ................................. | 123/470 |
| 4,201,172 | * 5/1980 | Jaggle et al. ......................... | 123/470 |
| 4,422,426 | * 12/1983 | Tsugekawa et al. ................. | 123/470 |
| 4,506,645 | * 3/1985 | Hewlitt et al. ...................... | 123/470 |
| 4,589,596 | * 5/1986 | Stumpp et al. ...................... | 123/470 |
| 4,647,012 | * 3/1987 | Gartner ................................ | 123/470 |
| 4,757,789 | 7/1988 | Laine . | |
| 4,768,487 | 9/1988 | Yamamoto et al. . | |
| 4,773,374 | 9/1988 | Kiuchi et al. . | |
| 5,329,902 | 7/1994 | Sakamoto et al. . | |
| 5,623,904 | 4/1997 | Matsumoto . | |
| 5,706,787 | 1/1998 | Fujikawa . | |
| 5,709,190 | 1/1998 | Suzuki . | |
| 5,735,240 | 4/1998 | Ito et al. . | |
| 5,775,288 | 7/1998 | Suzuki et al. . | |
| 5,860,394 | 1/1999 | Saito et al. . | |
| 5,934,253 | 8/1999 | Kojima et al. . | |
| 6,009,856 | 1/2000 | Smith, III et al. . | |
| 6,119,658 | * 9/2000 | Jehle et al. .......................... | 123/470 |
| 6,155,236 | * 12/2000 | Jehle et al. .......................... | 123/470 |

\* cited by examiner

*Primary Examiner*—Thomas N. Moulis
(74) *Attorney, Agent, or Firm*—Knobbe, Martens, Olson & Bear, LLP

(57) ABSTRACT

A fuel injector is mounting in a cylinder head assembly. The cylinder head assembly includes a mounting bore that extends into a recess wall that forms a portion of a combustion chamber. A sleeve is placed within the mounting bore. The fuel injector is secured with a nozzle portion extending through the sleeve. The fuel injector and sleeve interface is sealed by a heat resistant sealing member. The sleeve has any of a number of configurations designed to reduce the temperature of the nozzle. In addition, the nozzle can be recessed within the sleeve to reduce the direct exposure of the nozzle to flames propagated within the combustion chamber.

53 Claims, 9 Drawing Sheets

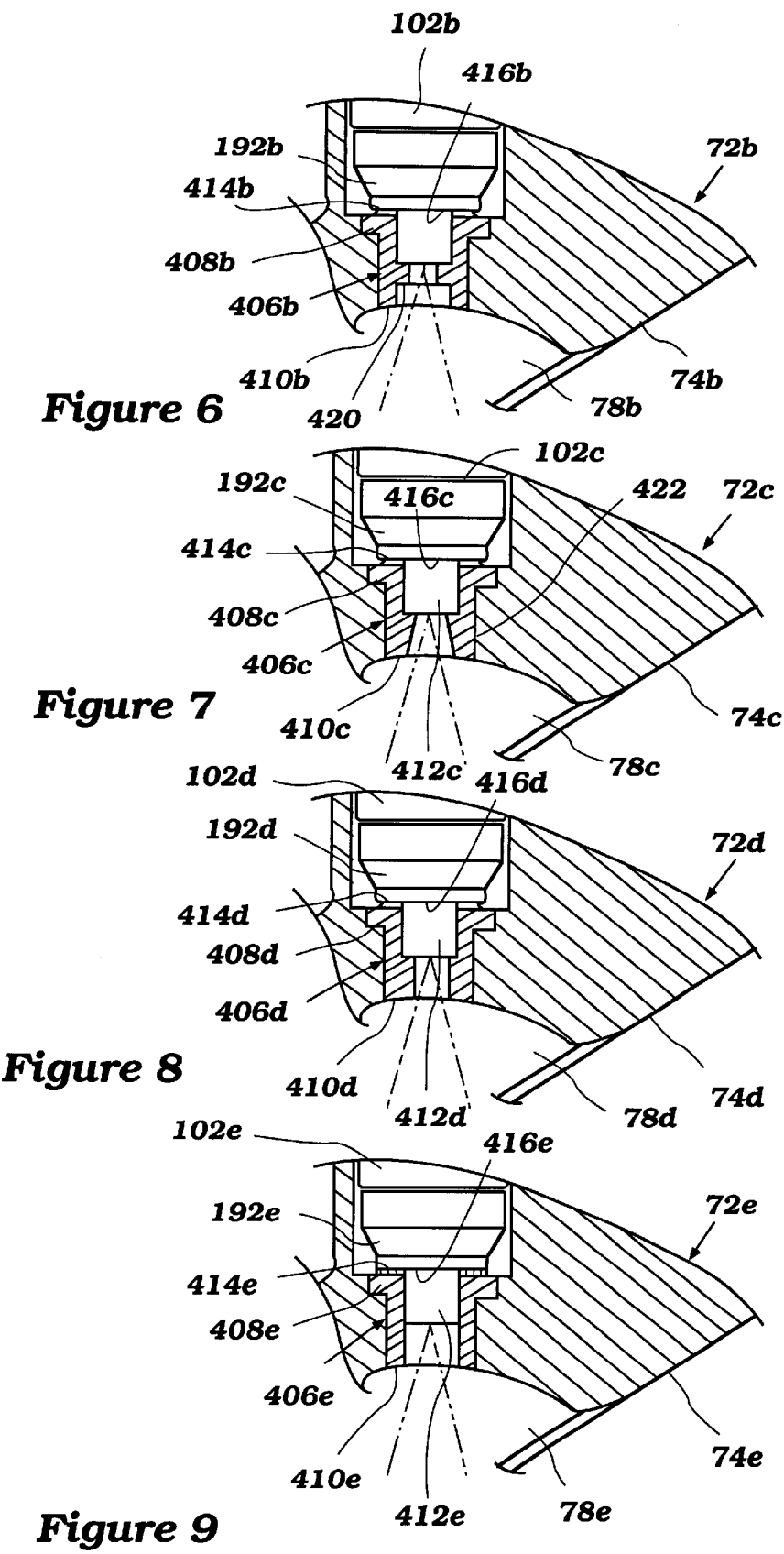

Injector Tip Clearance

Injector Tip Exposure

INJECTOR MOUNTING ARRANGEMENT FOR DIRECT-INJECTED ENGINES

BACKGROUND OF THE INVENTION

1. Field of the Invention

The present invention generally relates to directly injected engines. More specifically, the present invention relates to fuel injector mounting arrangements for such engines.

2. Description of Related Art

In all fields of engine design, there is an increasing emphasis on obtaining more efficient engine emission control, better fuel economy and, at the same time, continued high power output. This trend has resulted in the substitution of fuel injection systems for carburetors as the engine charge former. In commonly used systems, fuel is injected into an air intake manifold. This is considered indirect injection, meaning that the air-fuel charge is formed outside of the combustion chamber. To improve upon indirect injection, direct injection systems are being developed. These systems inject fuel directly into the combustion chamber for mixing with an air charge and thus have significant potential advantages, such as vastly improved emission control.

The fuel injector employed in a direct injection engine extends into a combustion chamber through an opening formed in the cylinder head assembly. The cylinder head assembly often is formed by casting. As is known, internal air pockets are typically formed within cast components. When forming the opening through which the fuel injector extends, as well as when forming a seat for sealing the fuel injector in its position, these air pockets are often uncovered. The air pockets result in reduced sealability of the assembly, thereby creating the possibility of leakage from the combustion chamber. This leakage is disadvantageous in that a portion of the air-fuel charge may be lost during each combustion stroke. In addition, high amounts of heat energy tend to escape and further degrade the seal between the components.

Additionally, in the conventional mounting arrangement, the fuel injector nozzle extends directly into the combustion chamber and is in direct contact with the high heat caused by the combustion of the air-fuel charge. As is known, the residual components following combustion can form carbon deposits that gum and partially occlude the fuel injector nozzle. These deposits typically form on surfaces of the injector and/or the cylinder head that are in direct contact with the combustion chamber under high heat conditions. The carbon deposits can make it difficult to remove the fuel injector when replacement is necessary. In addition, the deposits can form between the fuel injector body and the opening through which the fuel injector extends.

SUMMARY OF THE INVENTION

Accordingly, it would be desirable to reduce the level of heat associated with the end of the nozzle to reduce carbon deposits. Additionally, it would be desirable to be able to serially produce cylinder head assemblies with fuel injectors sealed therein without concern for voids and internal imperfections found within the cylinder head casting.

Thus, one aspect of the present invention involves a mounting arrangement for mounting a fuel injector within a cylinder head assembly of a direct injected engine. The arrangement comprises a cylinder head having a mounting bore. The mounting bore has a stepped configuration and extends through the cylinder head. The stepped configuration comprises a smaller diameter lower portion and a larger diameter upper portion. A sleeve extends through the smaller diameter lower portion and rests on a shoulder defined between the larger diameter upper portion and the smaller diameter lower portion. A fuel injector is positioned within the mounting bore with the fuel injector comprising a nozzle and a support flange. The nozzle extends at least partially into the sleeve and a sealing member is interposed between the support flange and the sleeve.

A further aspect of the present invention involves a mounting arrangement for mounting a fuel injector. The arrangement comprises a cylinder head and a sleeve that is positioned within the cylinder head. A fuel injector extends at least partially through the sleeve. The sleeve comprises a flange and a cylindrical portion with the cylindrical portion forming a passage into a combustion chamber. The flange abuts a surface of the cylinder head. A seal is positioned between the flange and the fuel injector.

Another aspect of the present invention involves a method of installing a fuel injector in a cylinder head. The method comprises casting a cylinder head and machining an opening in the cylinder head. A sleeve is positioned in the opening and a seal is placed over a portion of a fuel injector. The fuel injector is inserted into the sleeve and fixed in position within the sleeve.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures:

FIGS. 6 through 9 are sectioned side elevation views of additional preferred mounting arrangements of fuel injectors;

DETAILED DESCRIPTION OF THE PREFERRED EMBODIMENTS OF THE INVENTION

Figure 1:
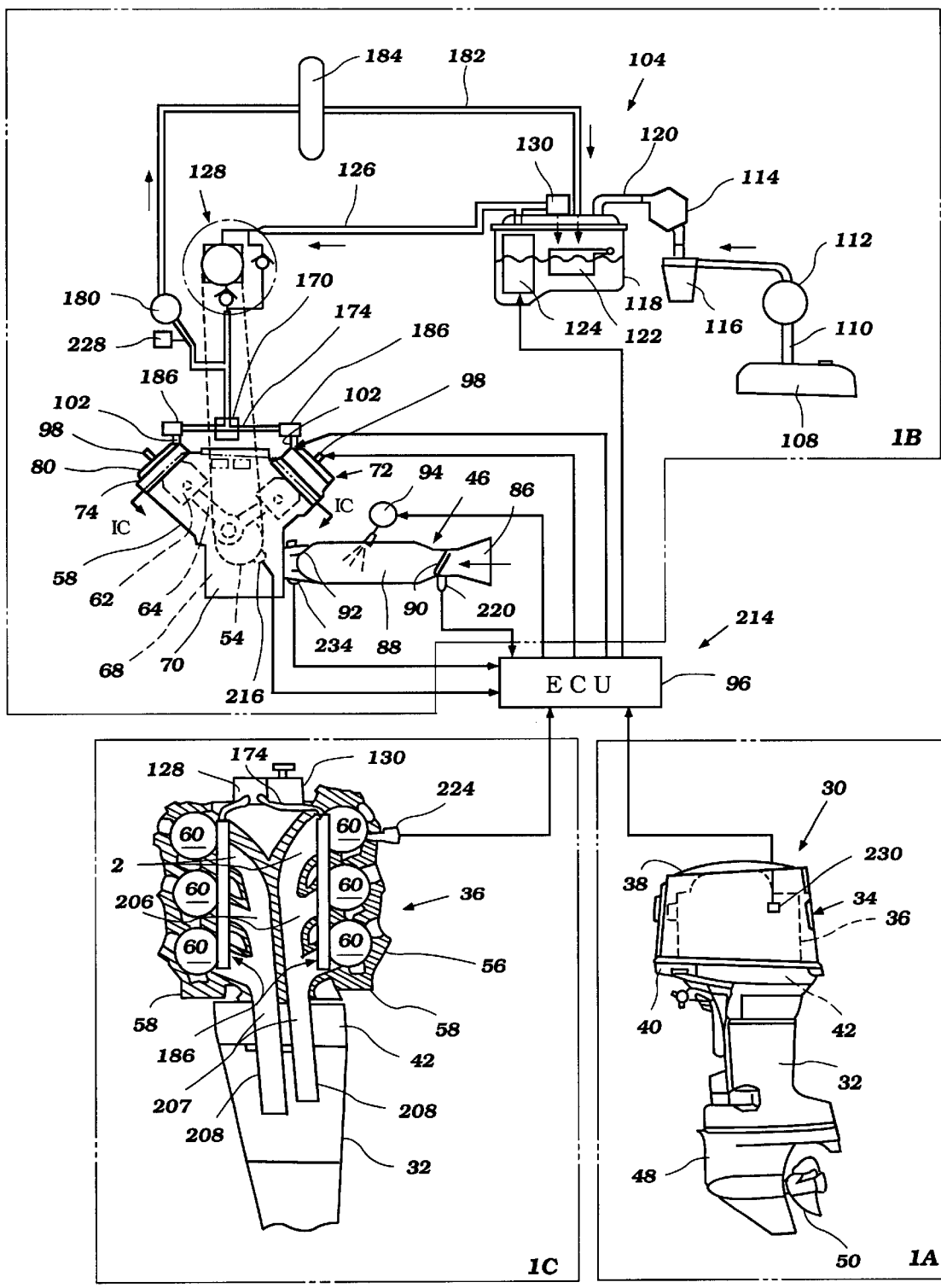
FIG. 1 is a schematic view of an engine which is configured and arranged in accordance with the present invention as employed on an outboard motor, the figure presents the outboard motor in side elevation view in section 1A, partial schematic views of the engine with associated portions of the induction and fuel supply systems in section 1B and section 1C is a sectioned view of the engine taken along the line I—I in 1B.

With initial reference to FIG. 1, an outboard motor employing a two-stroke engine will be generally described to provide an environment in which the present fuel injector mounting arrangement is practiced. To aid the discussion, FIG. 1 has been divided with phantom lines into three portions: 1a, 1b and 1c. While the present invention is illustrated in the context of a two-cycle outboard motor, it is anticipated that certain aspects of the present invention can be used in other environments. For instance, FIG. 13 will illustrate a four-cycle engine with which the present invention can be used. In addition, other engines for marine propulsion systems, such as stem drive systems, for land vehicles, such as motorcycles and automobiles, and for utility machines, such as lawn mowers, can also benefit from various features, aspects and advantages of the present invention. Moreover, the present invention can also be used with stationary engines, such generator motors or the like.

With reference now to FIG. 1a, an outboard motor having certain features, aspects and advantages in accordance with the present invention is illustrated in side elevation view and is indicated generally by the reference numeral 30. The entire outboard motor 30 is not illustrated. For instance, a swivel bracket and a clamping bracket that are commonly associated with a drive shaft housing 32 are not illustrated. These components are well known to those of ordinary skill in the art and understanding the specific method by which the present outboard motor 30 is mounted to a transom of a watercraft is not necessary to permit those skilled in the art to practice the present invention. Accordingly, features of the illustrated outboard motor that are not described in detail are considered to be well known to those of ordinary skill in the art and description of these features should not be necessary to understand the present invention.

The illustrated outboard motor 30 generally includes a power head 34. The power head 34 is positioned above the drive shaft housing 32 and includes a powering internal combustion engine 36. This engine 36 is shown in more detail in the remaining two sections of FIG. 1, and will be described shortly by reference thereto.

The power head 34 generally comprises a protective cowling which includes a top cowling member 38 and a lower tray 40. The top cowling member 38 preferably is detachably connected to the tray 40 in any suitable method. The tray preferably encircles an upper portion of the drive shaft housing 32 and encloses at least a portion of an exhaust guide 42 that forms a portion of an exhaust system of the engine 36.

The illustrated top cowling member 38 has a pair of inlets 43 that are placed at the rear in both sides of its body. The inlets 43 preferably open rearward and funnel air in the direction of the arrows A to an induction system of the engine for combustion. The air is introduced into the induction system through an air intake box 44. The air intake box 44 preferably is positioned on a forward facing portion of the illustrated engine, but may be otherwise configured in manners well known to those of ordinary skill in the art.

Positioned beneath the drive shaft housing 32 is a lower unit 48 in which a propeller 50, which forms a propulsion device for the associated watercraft, is journaled. As is typical with outboard motor practice, the engine 36 is supported in the power head 34 so that its crankshaft or output shaft 54 rotates about a generally vertically extending axis. This is done to facilitate connection of the crankshaft 54 to a drive shaft (not shown), which depends into the drive shaft housing 32 and which drives the propeller 50 through a conventional forward/neutral/reverse transmission that is contained in the lower unit 48.

With continued reference to FIG. 1, the illustrated engine is of the V-6 type and preferably operates on a 2-stroke crankcase compression principal. Although the invention is described in conjunction with this engine, it will be readily apparent to those of ordinary skill in the art that the present invention can be used with engines having other cylinder numbers and configurations. In addition, although the engine 36 will be described as operating on a 2-stroke principal, it will also be apparent to those of ordinary skill in the art that almost all facets of the present invention can be used in conjunction with the 4-stroke engines as will be described below.

The illustrated engine 36 generally comprises a cylinder block 56 that is formed with a pair of cylinder banks 58. Each of these cylinder banks 58 is formed with three vertically spaced horizontally extending cylinder bores 60. Pistons 62 preferably reciprocate within the cylinder bores 60 and are, in turn, connected to the small ends of connecting rods 64. The big ends of the connecting rods 64 are journaled on the throws of the crankshaft 54 in a manner that is well known to those of ordinary skill in the art.

The crankshaft 54 is journaled for rotation within a crankcase chamber 68. The chamber 68 is formed in part by a crankcase member 70 that is affixed to the cylinder block 56 in any suitable manner. The cylinder block 56 and the crankcase member 70 generally define an engine body. As is typical with 2-stroke engines, the crankshaft 54 and the crankcase chamber 68 are formed with webbed portions so that each section of the crankcase that is associated with one of the cylinder bores 60 will be substantially sealed from the others. This type of construction is well known to those of ordinary skill in the art.

A cylinder head assembly, indicated generally by the reference numeral 72, is affixed to the ends of the cylinder banks 58 that are spaced apart from the crankcase chamber 68. Each cylinder head assembly 72 generally is comprised of a main cylinder head member 74 that defines a plurality of recesses 76 in its lower face. Each of these recesses 76 cooperate with the respective cylinder bore 60 and the head of the piston 62 to define the combustion chambers 78 of the engine 36. A cylinder head cover member completes the cylinder head assembly 72. The main cylinder head member 74 and the cylinder block 56 are affixed to each other and to the respective cylinder banks in any suitable manner. In addition, a seal or gasket 81 may be positioned between the cylinder head cover member 80 and the cylinder head member 74.

An air induction system 46 is provided for delivering an air charge to the crankcase chamber 68. The crankcase chamber in turn communicates with the combustion chamber 78 of each cylinder 60. The air induction system 46 includes an intake port 82 formed in the crankcase member 70 and registering with each crankcase chamber section.

The induction system 46 supplies the induced air to a plurality of throttle bodies 88, each of which has a throttle valve 90 positioned therein. These throttle valves 90 are supported on throttle valve shafts as is well known to those of ordinary skill in the art. These throttle valve shafts are linked to each other for simultaneous opening and closing of the throttle valves 90 in a manner that is well known to those of ordinary skill in the art.

As is also typical in 2-stroke engine practice, the intake ports 82 include reed-type check valves 92. These check valves 92 permit the air to flow into the sections of the crankcase chamber 68 when the pistons 62 are moving upwardly in their respective cylinder bores. However, as the pistons 62 move downwardly, the charge will be compressed in the sections of the crankcase chamber 68. At that time, the check valves 92 will close so that the charge is compressed. In addition, lubricant pumps 94 are provided for spraying lubricant into the throttle bodies 88 for engine lubrication under the control of an ECU (electronic control unit) 96 that will be described in more detail later. Although it is not shown, some forms of direct lubrication can also be employed for delivering lubricant directly to certain components of the engine.

Figure 4:
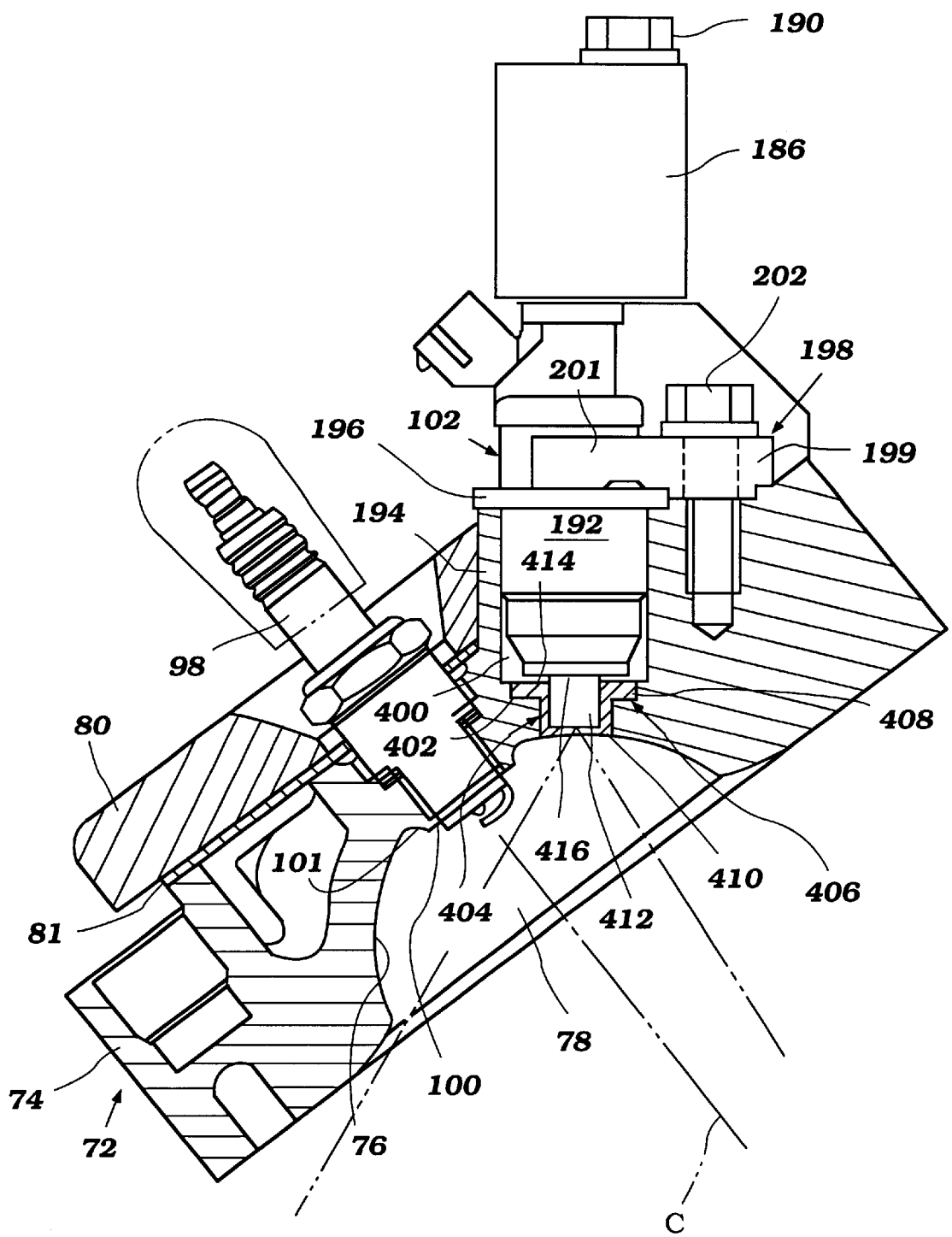
FIG. 4 is a sectioned side elevation view showing a preferred mounting arrangement of a fuel injector.

The air charge is transferred to the combustion chambers 78 through a scavenge port system (not shown) in a manner that is well known. As best shown in FIG. 4, a spark plug 98 for each combustion chamber 78 is inserted into an opening 100 formed in a boss 101 of the head assembly 74. The spark plug 98 in turn ignites a fuel-air charge that is formed by mixing fuel directly with the intake air via a fuel injector 102 positioned in each combustion chamber 78. The fuel injectors 102 are preferably solenoid type and electrically operated also under the control of the ECU 96. The illustrated fuel injectors 102 are mounted directly in the cylinder head member 74 in a specific location as will be described to provide optimum fuel vaporization under all running conditions. Moreover, while one fuel injector is shown for each combustion chamber, more than one fuel injector can be used in each combustion chamber where desired.

With reference to FIG. 1, fuel is supplied to the fuel injectors 102 by a fuel supply system, indicated generally by the reference numeral 104. The fuel supply system 104 comprises a main fuel supply tank 108 that preferably is positioned within the hull of the watercraft. Fuel is drawn from this tank 108 through a conduit 110 by a first low-pressure fuel pump 112 and at least one second low-pressure fuel pump 114. The first low-pressure fuel pump 112 is a manually-operated pump and the second low-pressure pump 114 is preferably a diaphragm-type pump operated by pressure variations in the sections of the crankcase chamber 68. Thus, the second low-pressure pumps 114 provide a relatively low pressure. A quick disconnect coupling (not shown) is provided in a conduit 110 along with a fuel filter 116.

From the low-pressure pump 114, fuel is supplied to a vapor separate 118 that is mounted on the engine 36 or within the top cowling member 38 at an appropriate location. The fuel is supplied to the vapor separator 118 through a supply line 120. At the vapor separator end of the line 120, there is provided a float valve (not shown) that is operated by a float 122 to maintain a substantially uniform level of fuel in the vapor separator 118.

A high pressure electric fuel pump 124 is preferably provided within the vapor separator 118 and pressurizes fuel that is delivered through a fuel supply line 126 to a high pressure pumping apparatus indicated generally by the reference numeral 128. The electric fuel pump 124, which is driven by an electric motor, develops a pressure of approximately three to approximately 10 kg per centimeter squared. A pressure regulator 130 is positioned in the fuel supply line 126 proximate the vapor separator and limits the pressure of the fuel that is delivered to the high pressure pumping apparatus 128 by dumping fuel back into the vapor separator 118.

The high-pressure fuel pumping apparatus 128 can develop a pressure of approximately 50 to 100 kg per centimeter squared or more in the illustrated embodiment. A pump drive unit 130, illustrated in the section 1c of FIG. 1, is provided for driving the high-pressure fuel pump 128.

Figure 2:
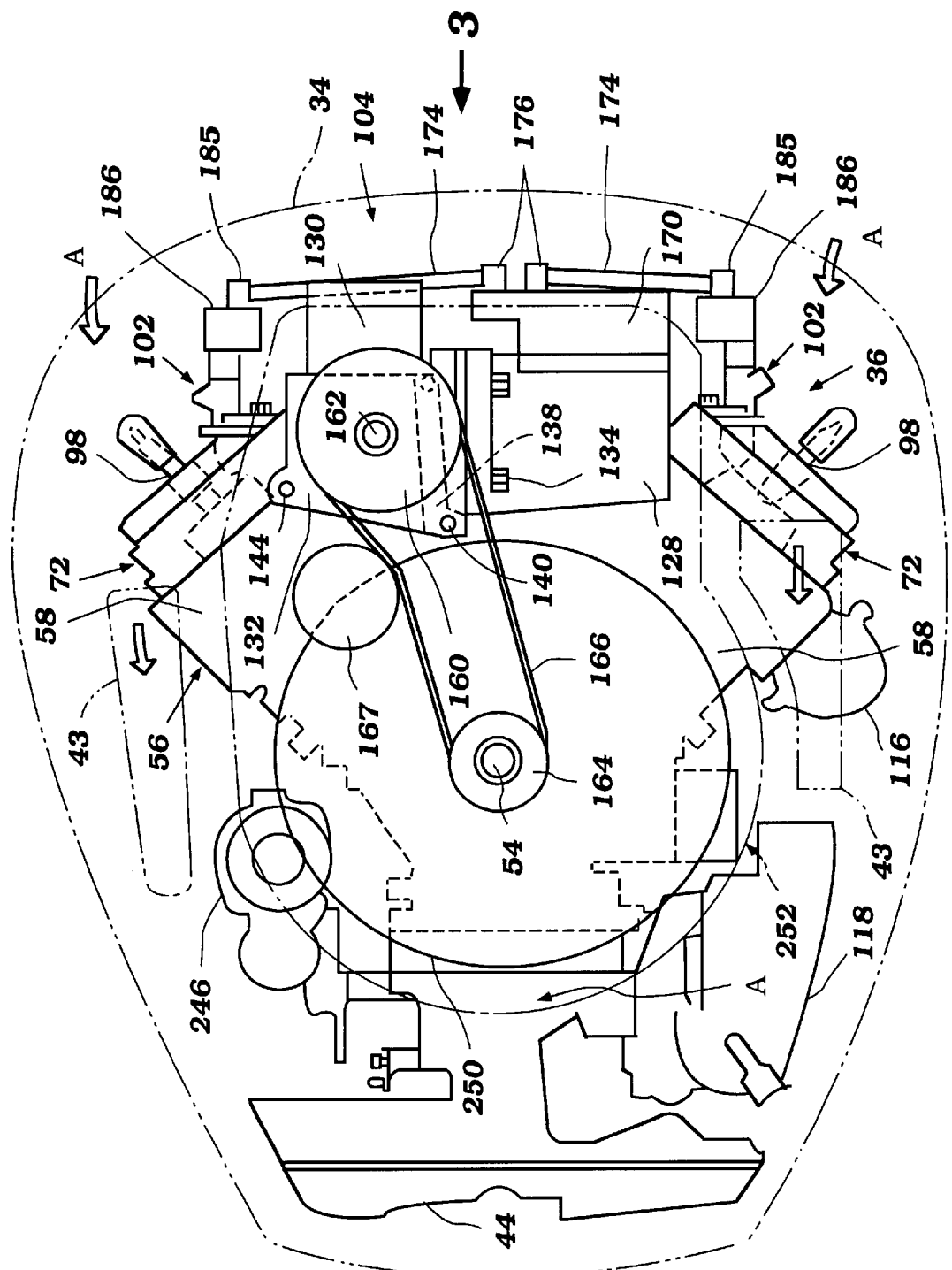
FIG. 2 is a top plan view showing a power head incorporating the engine with the engine shown in solid lines and a protective cowling shown in phantom lines.
Figure 3:
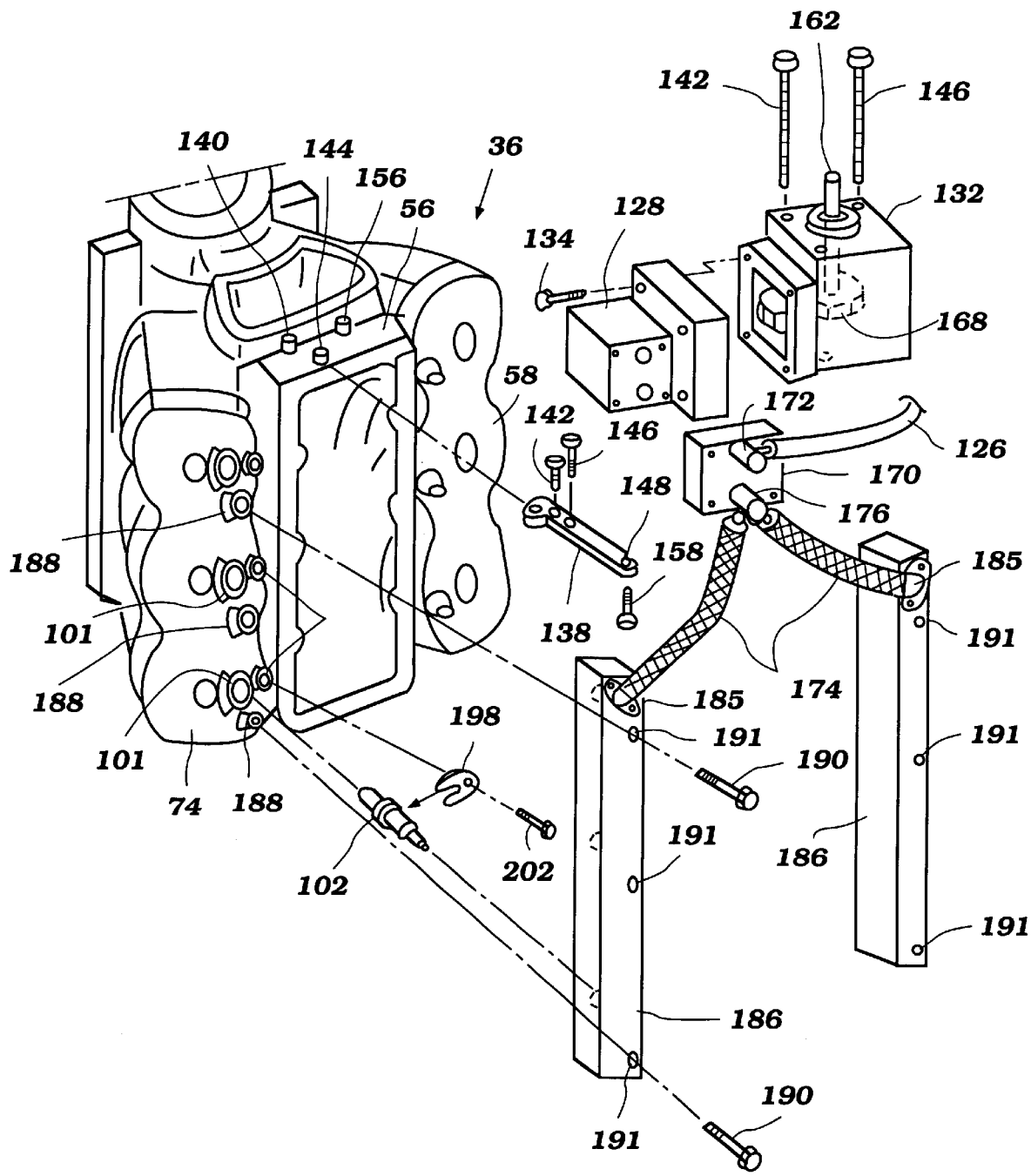
FIG. 3 is a schematic exploded perspective view showing components of a high pressure fuel injection assembly taken generally in the direction of the arrow 3 in FIG. 2.

With reference primarily to FIGS. 2 and 3, the high-pressure fuel pump 128 is mounted on the pump drive unit 132 with bolts 134. A stay 138 is affixed to the cylinder block 56 at a boss 140 with a bolt 142 and at a boss 144 with a bolt 146. The pump drive unit 132, in turn, is affixed to the stay 138 at a bolt hole 148 with a bolt 150 and at the bolt hole 152 with a bolt 154. The pump drive unit 132 is also affixed to the cylinder block 56 directly at a boss 156 with a bolt 158. Thus, the pump drive unit 132 overhangs between the two banks 58 in the illustrated engine.

A pulley 160 preferably is affixed to a pump drive shaft 162 of the pump drive unit 132. The pulley 160 in the illustrated engine is driven by a drive pulley 164 affixed to the crankshaft 54. The drive pulley rotation is transferred to the pulley 160 using a drive belt 166. The belt 166 is preferably tensioned by an idler pulley 167. The drive shaft 162 is provided with a camdisk 168 that extends in a horizontal plane and pushes plungers (not shown) which are disposed on the high pressure fuel pump 128.

The high-pressure fuel pump 128 has a unified fuel inlet and outlet module 170, which is mounted on a sidewall of the pressure pump 128. The inlet and outlet module 170 has an inlet passage (not shown) connected to the fuel supply line 126 with a connector 172, while an outlet passage (not shown) is connected to a pair of flexible conduits 174 with a connector 176.

As seen in FIG. 1, the pressure of the fuel supplied by the fuel pump 128 is regulated by a high pressure regulator 180 which dumps fuel back to the vapor separator 118 through a pressure relief line 182 in which a fuel heat exchanger or cooler 184 is provided. It has been determined to be relatively important to keep the fuel under a substantially constant pressure because the fuel amounts are determined by changes of duration of injection under the condition that the pressure for the injection is substantially constant. With continued reference to FIGS. 2 and 3, the flexible conduits 174 are preferably connected to fuel supply rails 186 with connectors 185. The fuel supply rails 186 are preferably made of metal to be rigid. The fuel supply rails 186 communicate with the flexible conduits 174 and also fuel injectors 102 when they are connected to the fuel supply rails 186.

With reference now to FIG. 2, the fuel rails 186 are preferably affixed to the respective main cylinder head members 74. As illustrated, the main cylinder head members 74 include a set of bosses 188 that receive a corresponding set of positioning bolts 190, which are used to attach the illustrated fuel rails to the respective main cylinder head members 74. The fuel rails preferably include a set of apertures 191 that accommodate the positioning bolts 190.

With reference to FIG. 3, the illustrated fuel injectors 102 are desirably interposed between the fuel supply rails 186 and the main cylinder head members 74. The fuel injectors 102 include mounting sections 192 that preferably are inserted into bosses 194 formed on the main cylinder head members 74. The illustrated fuel injectors 102 also preferably include flange portions 196, which are clamped in position by a corresponding set of forked members 198.

The forked member 198 generally comprises a base portion 199 and a retainer portion 201. The base portion 199 is affixed to the main cylinder head member 74 with bolts 202 in the illustrated engine. The retainer portion 201 preferably extends around at least a portion of the circumference of the fuel injector 102 to form a yoke-like structure about the fuel injector 102 by generally surrounding a base portion of the fuel injector nozzle.

Preferably, the forked member 198 is made of anti-corrosive metal such as stainless steel and aluminum or synthetic resin. More preferably, the forked member is formed of a material that reduces or eliminates galvanic reaction between the materials of the forked member and the cylinder head or bolts. In this manner, the forked member 198 is prevented from corroding and deteriorating, and maintains its shape and integrity in order to apply a generally constant loading on the fuel injector over an extended period. The fuel injector mounting construction and loading will be described in more detail below.

Although the same bosses 188, 194, 200 are provided on the cylinder head member 74 of the other bank 58, they are simply schematically shown in FIG. 3 to reduce redundancy in the present description.

The high pressure fuel pump 128, the pump drive unit 132, the inlet and outlet module 170, the flexible conduits 174, the fuel rails 186 and the fuel injectors 102 are preferably assembled together into a single high pressure fuel injection assembly 206.

Fuel is delivered by the high-pressure fuel pump 128 to the flexible fuel conduits 174. The fuel conduits 174, in turn, deliver fuel to the pair of generally vertical fuel rails 186. The fuel rails 186, then, supply fuel to the fuel injectors 102.

As seen in FIG. 1B, after the fuel charge has been formed in the combustion chambers by the injection of fuel from the fuel injectors 102, the charge is ignited by the spark plugs 98 in a manner well known to those of ordinary skill in the art. The injection timing and duration, as well as the ignition timing, are controlled by the ECU 96 in the illustrated engine using any suitable control routine.

As the charge burns and expands, the pistons 62 are driven downwardly in the cylinder bores 60 until the pistons 62 reach a lowermost position. With the pistons 62 in this lowermost position, an exhaust port (not shown) is uncovered and the combustion chamber is placed in communication with an exhaust passage 204 formed in the cylinder block 56. The exhaust gases flow through the exhaust passages 204 to an exhaust manifold 206 of the respective cylinder banks. These exhaust manifolds communicate with exhaust passages 207 formed through the exhaust guide plate 42 on which the engine 36 is mounted.

A pair of exhaust pipes 208 depend from the exhaust guide plate 42. The pipes 208 preferably extend the exhaust passages 204 into an expansion chamber (not shown) formed in the driveshaft housing 32. From the expansion chamber, the exhaust gasses are discharged to the atmosphere through any suitable exhaust system. As is well known in outboard motor practice, the exhaust system may include an underwater, high speed exhaust gas discharge and an above the water, low speed exhaust gas discharge. Because the exhaust system components are well known, further description of the components is believed unnecessary.

As described above, a control system, which is indicated generally by the reference numeral 214, is provided. The control system 214 advantageously controls, among other components, the initiation and duration of fuel injection and the ignition timing. The feedback control system 214 generally comprises the ECU 96 and a number of sensors, which sense a number of engine operating conditions, ambient conditions or other conditions of the outboard motor 30.

With reference again to FIG. 1, a crankshaft angle position sensor 216 is positioned proximate the crankshaft 54. The sensor 216 measures crankshaft angle versus time and outputs a signal indicative of crankshaft rotational speed or engine speed as generally indicated. The ECU 96 receives the signal for processing.

The engine also features a throttle position sensor 220 that emits a signal indicative of operator demand or engine load as determined by the positioning of the throttle valve 90. When the operator desires to increase the operating speed, a throttle is operated by the operator. The throttle valve 90 is selectively opened to a degree that generally corresponds to the desired speed at which the watercraft operator desires the watercraft to move. In addition, as the engine load increases, for example, when the watercraft is operated into the wind, the operator may also increase the throttle position so as to recover the speed that may be lost by the opposition of the wind.

The engine also preferably features a combustion condition or oxygen ($O_2$) sensor 224 which senses the in-cylinder combustion conditions by sensing the residual amount of oxygen in the combustion products at a time near the time when the exhaust port is opened.

In addition, the engine preferably features a pressure sensor 228 which is positioned proximate the pressure regulator 180 of the illustrated fuel supply system. Although not illustrated, the pressure sensor 228 preferably also outputs a fuel supply pressure signal to the ECU 96.

There also may be provided a water temperature sensor 230 (see the lower right-hand view) which outputs a cooling water temperature signal to the ECU 96 and an air intake temperature sensor 234 (see the upper view) which outputs an air temperature signal to the ECU 96.

Although only the above-described sensors are illustrated in FIG. 1, other sensors, such as, for instance but without limitation, an engine height sensor, a trim angle sensor, a knock sensor, a neutral sensor, a watercraft pitch sensor and an atmospheric temperature sensor can also be provided to function with various control strategies.

The ECU 96, as has been noted, preferably outputs control signals to the fuel injectors 102, the spark plugs 98, the lubrication pumps 94 and the high pressure electric fuel pump 124. The control signals are indicated schematically in FIG. 1. Of course, as will be appreciated by those of ordinary skill in the art, other features of the engine or motor can also be controlled by the ECU 96.

With reference now to FIG. 2, the engine also generally comprises a starter system. The starter system preferably includes a starter motor 246 that selectively engages with a flywheel 250 to turn the crankshaft 54 to initiate ignition. Of course, the flywheel is preferable positioned at an upper end of the crankshaft 54 below a cover 252 as is generally known to those of ordinary skill in the art. The cover member 252 also preferably covers other components of the engine, such as the high-pressure fuel pump 128.

With reference now to FIGS. 4 through 9, an inventive mounting arrangement for the present fuel injectors will be described in detail. Although a plurality of fuel injectors 102 are mounted for multiple cylinders of the engine 36 in this embodiment, a single fuel injector 102 will be described. Of course, if desired, multiple fuel injectors can be positioned to inject into any single combustion chamber.

With reference now to FIG. 4, the main cylinder head member 74 preferably includes the enlarged boss section 194. As illustrated, the boss section 194 is desirably positioned to one side of an axis C of the illustrated cylinder bore 60. The illustrated boss section 194 includes an inclined mounting bore 400 that is sized and configured to receive at least a portion of the fuel injector 102. The mounting bore 400 is preferably machined into the main cast cylinder head member 74.

The illustrated mounting bore 400 preferably includes a counterbore section 402 and a through hole 404 that extends into the combustion chamber 78 through the recessed wall 76. The counterbore section 402 is positioned at a bottom of the larger diameter mounting bore 400 and desirably receives a portion of a mounting sleeve 406.

The mounting sleeve 406 preferably includes a flange portion 408 and a cylinder portion 410. The flange portion 408 extends outward from the cylinder portion 410 and rests at least partially within the counterbore section 402. Preferably, the flange portion 408 is mounted flush within the bottom of the larger diameter mounting bore 400. The cylinder portion 410 depends downward through the hole 404 and advantageously forms a guide for a nozzle 412 of the fuel injector 102.

Preferably, the clearance provided about the periphery of the flange portion 408 is slightly larger than the clearance provided about the exterior of the cylinder portion 410. Accordingly, during insertion of the sleeve 406 into the hole 404, the flange portion 408 is less likely to be warped or bent. Moreover, the relative clearances aid in reducing the presence of residual chips.

Preferably, the sleeve 406 is made of anti-corrosive metal such as stainless steel and aluminum or synthetic resin. More preferably, the sleeve 406 is formed of a material that reduces or eliminates galvanic reaction between the materials of the sleeve and the head assembly. For instance, the head and the sleeve may be manufactured from the same material (i.e., aluminum). In this manner, the sleeve 406 is prevented from corroding and deteriorating, and maintains its shape and integrity over an extended period of time.

With continued reference to FIG. 4, the fuel injector 102 is sealed in position using a resilient and preferably heat resistant sealing member 414. The sealing member is advantageously interposed between the flange portion 408 of the mounting sleeve 406 and a support surface 416 of the fuel injector 102. As explained above, the fuel injector is secured in position by the forked member 198. Preferably, the fuel injector is urged into position with sufficient force to allow a substantial seal to be formed between the support surface 416 and the flange 408.

Advantageously, the mounting sleeve 406 forms a smooth surface against which the fuel injector 102 may be mounted and with which the sealing member can seal. In the illustrated arrangement, the sealing member has a linear width of several hundred millimeters. Accordingly, the sealing surface area is extremely limited. If a void or other imperfection is uncovered, exceptional measures are likely required to form an adequate seal between the fuel injector and the cylinder head member. The present sleeve alleviates this problem. Thus, while machining the bore 400, the counterbore 402, and the hole 404, voids or other imperfections found within material of the head member casting may be covered by the sleeve without affecting the sealing of the fuel injector into the head member. The sleeve has an increased surface area that can form the seal. Additionally, the sleeve can be structured for a press fit or interference fit such that both the sides and the bottom of the sleeve form a seal between the sleeve and the cylinder head member. Of course, the flange portion, the cylinder portion or both in combination can form the seal between the sleeve and the cylinder head member. In addition, the sleeve may be positioned by pouring, screwing, welding, adhering, brazing or any other suitable method.

The present sleeved mounting arrangement greatly increases the sealability of fuel injectors with the cylinder head assembly. Accordingly, the present arrangement reduces the need to manually inspect each assembly as it is manufactured and further reduces the need to remove and reinstall fuel injectors that have been positioned over such an imperfection or void. Moreover, replacement of spent fuel injectors becomes easier because the fuel injectors need not be custom fit to avoid or reduce leakage from the combustion chamber.

Figure 5:
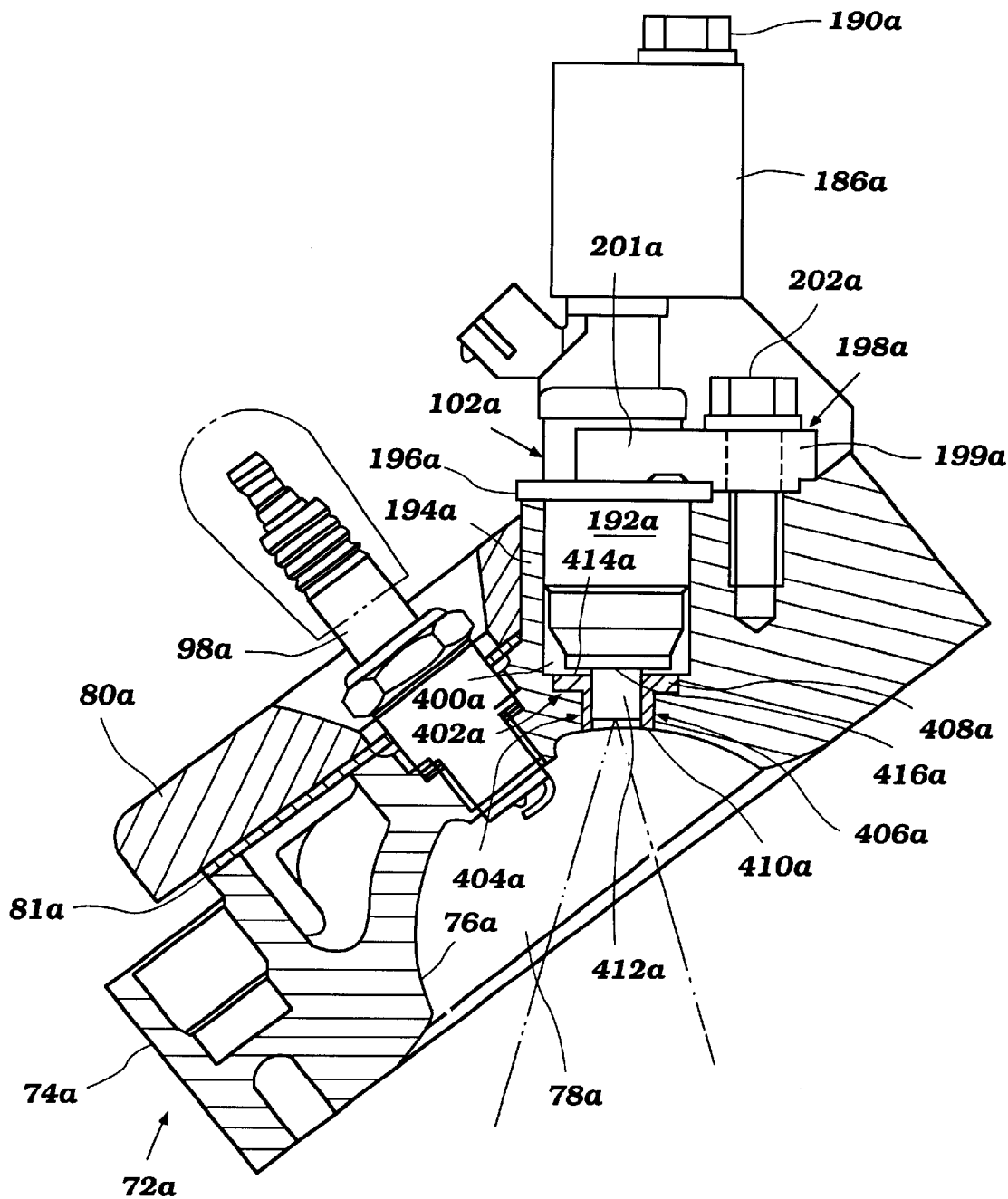
FIG. 5 is a sectioned side elevation view showing another preferred mounting arrangement of a fuel injector in which the nozzle of the fuel injector is recessed an increased amount over the arrangement of FIG. 4.

With reference now to FIG. 5, another fuel injector mounting arrangement is illustrated therein. Because the mounting arrangement is similar to the mounting arrangement described with reference to FIG. 4, like reference numerals have been used to refer to like components with the addition of the suffix a. For instance, the sleeve of FIG. 4 is indicated by the reference numeral 406 and the sleeve of FIG. 5 is indicated by the reference numeral 406a.

As illustrated in FIG. 5, the nozzle 412a of the fuel injector 102a has been recessed into the sleeve as compared to the positioning of the nozzle 412 of FIG. 4. The recessing is accomplished in the illustrated arrangement by increasing the depth of the hole through which the fuel injector extends. In other words, the mounting bore 400a has a reduced depth as compared to the arrangement of FIG. 4. Such a configuration allows the length of the sleeve 410a to be increased. In the illustrated arrangement, the distal end of the nozzle 412a is recessed nearly one half of the length of the cylindrical portion 410a. This location is determined, at least in part, by the spray pattern of the nozzle 412a. Particularly, the nozzle 412a is preferably recessed into the sleeve 406a a sufficient distance to reduce the extent to which the tip of the fuel injector 102a is directly exposed to flames whereby the tip is somewhat protected from the flames within the combustion chamber. Thus, the increase of the tip temperature of the fuel injector 102a can be monitored and reduced. In addition, carbon deposit build-up can be reduced around the injector nozzle because the injector is not within direct contact with a substantial portion of the flame propagation.

With reference now to FIGS. 6 through 9, four additional mounting arrangements are illustrated therein. Each of the arrangements has been designed to reduce the contact area between the fuel injector nozzle and the flames propagated within the combustion chamber. As with FIG. 5, like elements have been labeled with like reference numerals in FIGS. 6 through 9 with the suffix of b, c, d and e being added respectively. Moreover, the above description of the mounting arrangement and configuration generally applies unless otherwise noted or understood.

With reference to FIG. 6, the sleeve includes an internal restricting flange through which the injected fuel is sprayed. Desirably, the restricting flange 420 does not inhibit the injection of fuel. Moreover, the illustrated mounting flange advantageously protects the tip of the fuel injector from substantial and direct contact with flames propagated within the combustion chamber during combustion. Because contact between the fuel being injected and the inner surfaces of the sleeve 408b is reduced or eliminated, carbon deposits at the nozzle of the fuel injector are greatly reduced.

With reference now to FIG. 7, the sleeve 406c preferably features a tapering inner wall 422. The tapering wall, similar to the restricting flange, reduces direct contact between the flames and the nozzle of the fuel injector. In addition, with reference to FIG. 8, the sleeve 406d includes an inner shoulder against which a portion of the nozzle 412d rests. As explained above, each of the arrangements of FIGS. 6 through 8 advantageously reduce the extent of direct contact between flames within the combustion chamber and the nozzle of the fuel injector. In addition, the fuel mists injected by the fuel injectors preferably do not contact with the inner surface of the sleeve and the amount of residual fuel left on the tip of the fuel injector is substantially reduced. Moreover, the arrangements also reduce damaging carbon deposits that may form in gaps between the injector and adjoining surfaces. The carbon deposits could cause the fuel injector to seize within the mounting bore if they are allowed to build-up to a sufficient level.

With reference now to FIG. 9, the mounting arrangement is generally the same as the mounting arrangements described above. Advantageously, the sealing member 414e used in the arrangement of FIG. 9 is preferably manufactured of asbestos, a synthetic resin or another similar material. More preferably, the sealing member 414e resists heat and flames and better protects the fuel injector and the mounting arrangement. Such a heat resistant sealing member and mounting arrangement helps to further reduce the build-up of damaging carbon deposits both on the injector and the surrounding components.

Figure 10:
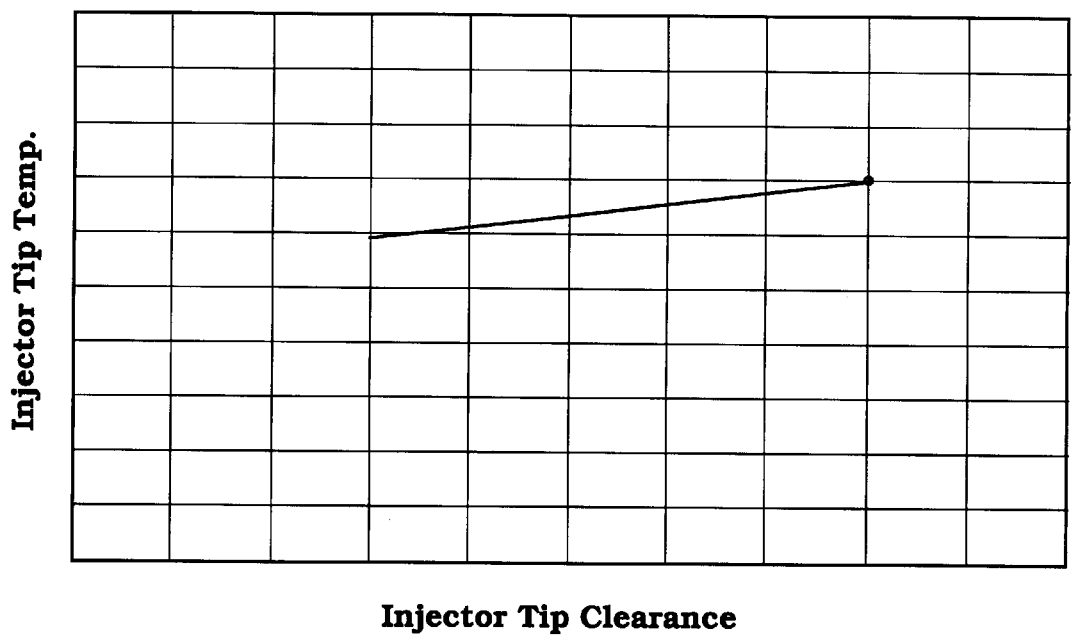
FIG. 10 is a graphical depiction of a relationship between clearance between the fuel injector nozzle and the mounting sleeve.

With reference to the graphical illustrations of FIGS. 10 through 12, the present mounting arrangements and their effects upon the temperature increases at the tip of the fuel injector nozzle will be discussed. With reference initially to FIG. 10, the clearance between the fuel injector nozzle and the sleeve impacts the overall increase in temperature experienced by the fuel injector. Specifically, as illustrated, increasing the clearance between the sides of the injector and the cylinder of the sleeve allows heat and flames to build the temperature of the fuel injector due to the increased surface area against which the heat can circulate. Moreover, an increased clearance results in better heat circulation such that more heat is transferred into the fuel injector as the clearance between the sleeve and the nozzle is increased. Accordingly, where possible, it is desirable to decrease the clearance between the nozzle and the sleeve.

Figure 11:
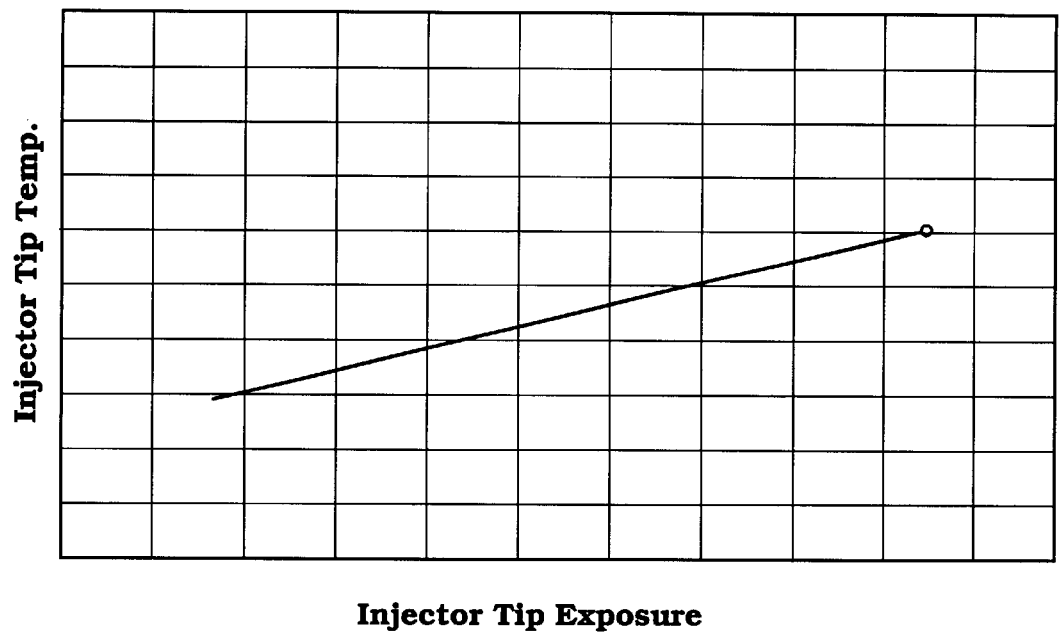
FIG. 11 is a graphical depiction of a relationship between the exposed area of the fuel injector nozzle tip and the nozzle tip temperature.

With reference to FIG. 11, the exposed area at the tip of the injector also impacts the degree to which the fuel injector is heated. As illustrated, the temperature increases as the exposed surface area increases. Accordingly, the embodiment of FIG. 6 is likely to increase in temperature more slowly than the embodiment of FIG. 5 due to the decrease in exposed surface area. Thus, by reducing the exposed tip area, the increase in injector temperature can be managed and reduced. However, as will be appreciated, the exposed area can only be decreased to a certain extent due to manufacturing constraints and component sizing requirement.

Figure 12:
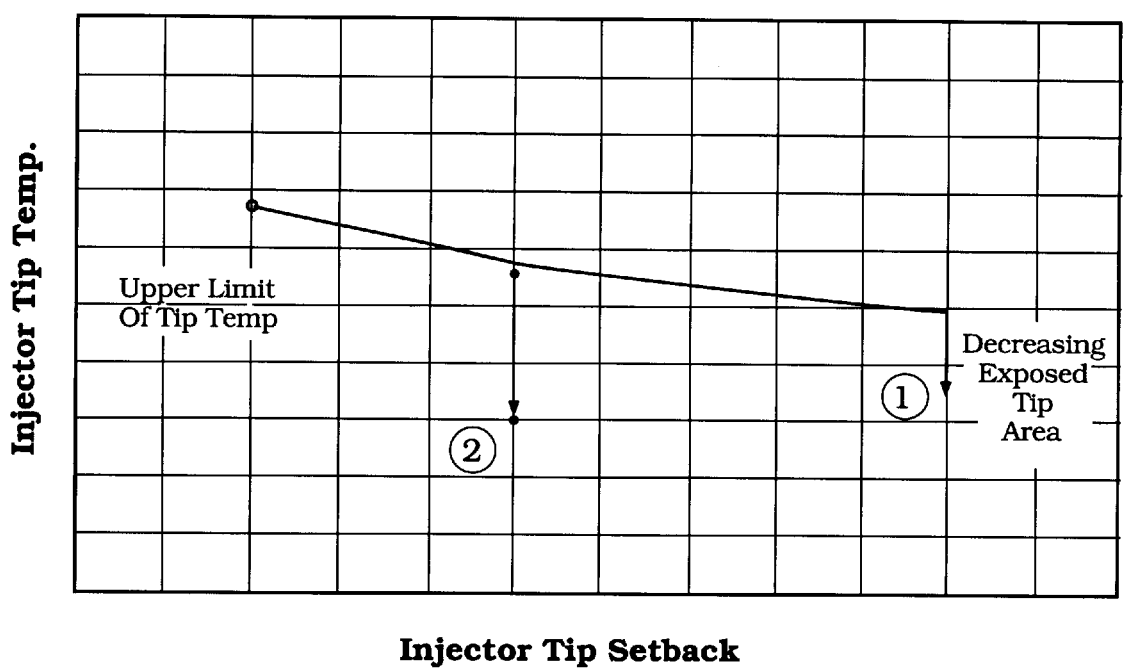
FIG. 12 is a graphical depiction of a relationship between the degree of fuel injector nozzle tip recess and the nozzle tip temperature.

Similarly, with reference to FIG. 12, the extent to which the tip of the fuel injector is recessed within the sleeve also impacts the degree to which the fuel injector is heated. According to the graph, by increasing the depth of recess, increases in fuel injector temperature can be controlled or limited. As illustrated, at a certain threshold temperature (i.e., between about 150 degrees Centigrade and about 170 degrees Centigrade), additional increases in temperature can harm injector performance. For instance, the threshold is preferably set at approximately to the evaporation temperature of about 90% of the constituent components of fuel. Above this threshold, the heavier oil components of the fuel begin to deposit on the fuel injector nozzle. As is known, excessive depositions of heavy oil components on the injector nozzle adversely affect the fuel spray pattern as well as the amount of fuel being injected. Accordingly, a combination of altering the exposed tip area as well as setting the tip of the nozzle further back into the sleeve can be used to achieve a tip temperature below the threshold level. Two examples of such combinations are graphically depicted by arrows 1 and 2 in FIG. 12. Of course, any number of combinations can be used to lower the temperature at the tip of the injector to any desired temperature.

Figure 13:
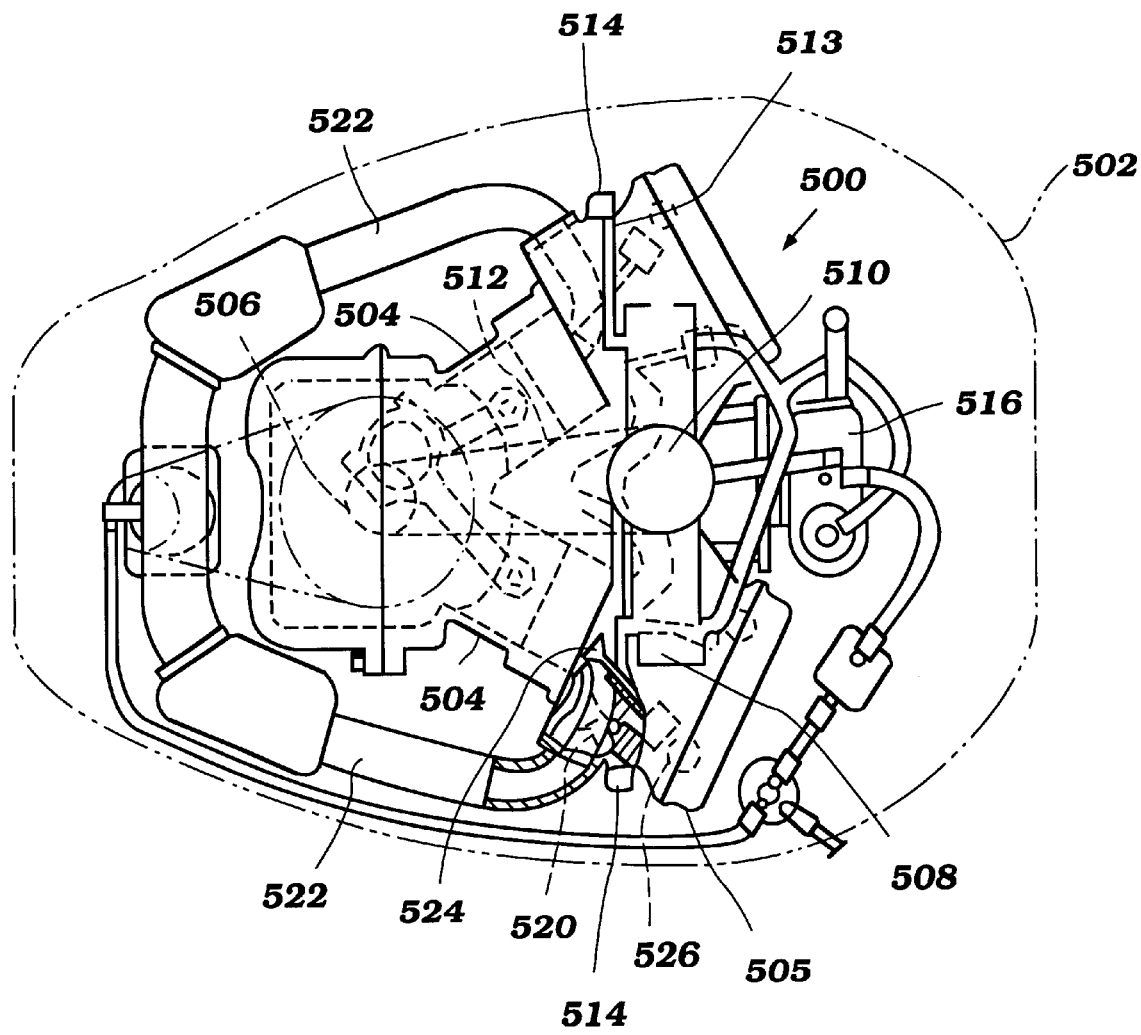
FIG. 13 is a top plan view showing a power head incorporating the engine with the engine shown in solid lines and a protective cowling shown in phantom lines, the engine employing a further mounting arrangement arranged and configured in accordance with the present invention.

With reference now to FIG. 13, a further arrangement of the present invention is illustrated therein. The disclosed arrangement is shown as applied to a four-cycle engine. Specifically, the engine, which is indicated generally by the reference numeral 500, is positioned within a cowling 502 in a manner described above. The engine preferably is arranged in a v-type configuration with a pair of cylinder banks 504 inclined relative to one another. As disclosed above, each of the cylinder banks 504 preferably includes a suitable cylinder head assembly 505 to define a combustion chamber for each cylinder.

The engine 500 includes a crankshaft 506 that is driven in a manner well known to those of ordinary skill in the art. The crankshaft 506, in turn, drives a fuel pump 508 through a pump drive unit 510 via a drive belt 512. Each of these components is arranged as disclosed above. Moreover, any suitable drive arrangement can be used to power the fuel pump 508.

The fuel pump 508 supplies fuel to a set of fuel rails 514 in a manner similar to that described above and illustrated in FIG. 1. The fuel is desirably drawn from a fuel supply tank and passed through a vapor separator 516 before being pumped through fuel supply pipes 513 to the fuel rails 514. Fuel can be recirculated through the fuel system to maintain a proper operating pressure as desired. In the illustrated engine 500, the fuel is recirculated through a flexible conduit 518 back to the vapor separator 516.

The fuel rails 514 desirably communicate with fuel injectors 520 that are positioned to directly inject fuel into the combustion chambers. The fuel injectors 520 are preferably mounted as disclosed above and operate to inject fuel directly into each cylinder.

The injected fuel mixes with an air charge provided by any suitable induction system. In the illustrated arrangement, a set of intake pipes 522 draws air from within the cowling 502 and supplies the air to the combustion chamber. An intake valve 524 is positioned over an intake port in each cylinder to control the inflow of air charges. As is known, the valves 524 are preferably operated by a set of cam shafts 526 provided within the cylinder head assemblies 505.

FIG. 13 depicts an exemplary four-cycle engine with which the present fuel injector mounting arrangement can be used. Of course, as will be recognized by those of ordinary skill in the art, the present mounting arrangement can be used with any number of engine configurations. The mounting arrangement ensured proper seating and sealing of fuel injectors within the cylinder head assembly. Thus, in die cast cylinder heads, the presence of imperfections, flaws or voids can be accommodated without having to custom fit a fuel injector for proper sealing. Moreover, the present mounting arrangement protects the fuel injector from undesirable temperature increases in manners described above.

Although the present invention has been described in terms of a certain preferred embodiments, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. It also is anticipated that some features of one embodiment may be used with another embodiment where desirable. Accordingly, the scope of the present invention is intended to be defined only by the claims that follow.

What is claimed is:

1. A mounting arrangement for mounting a fuel injector within a cylinder head assembly of a direct injected engine, the arrangement comprising a cylinder head comprising a mounting bore, said mounting bore having a stepped configuration and extending through said cylinder head, said stepped configuration comprising a smaller diameter lower portion and a larger diameter upper portion, a sleeve extending through said smaller diameter lower portion and resting on a shoulder defined between said larger diameter upper portion and said smaller diameter lower portion, a fuel injector being positioned within said mounting bore and comprising a nozzle and a support flange, said nozzle extending at least partially into said sleeve and a sealing member being interposed between said support flange and said sleeve.

2. The arrangement of claim 1, wherein said sleeve is made of the same material as said cylinder head.

3. The arrangement of claim 1, wherein said sleeve is pressed into position within said smaller diameter lower portion of said mounting bore.

4. The arrangement of claim 1, wherein a fit of said sleeve within said mounting bore is slightly closer between the sleeve and the smaller diameter lower portion of said mounting bore than between said sleeve and said larger diameter upper portion of said mounting bore.

5. The arrangement of claim 4, wherein said engine is a two-cycle engine.

6. The arrangement of claim 5, wherein said cylinder head is die cast aluminum.

7. The arrangement of claim 1, wherein said nozzle is recessed into said sleeve such that the nozzle is not flush with a lower surface of said cylinder head.

8. The arrangement of claim 1, wherein said sealing member is manufactured of a heat resistant material.

9. The arrangement of claim 8, wherein said sealing member is manufactured of asbestos.

10. The arrangement of claim 1, wherein an inner surface of said sleeve has a portion with a smaller diameter than said nozzle.

11. The arrangement of claim 10, wherein said inner surface of said sleeve tapers to said smaller diameter from said bottom surface of said cylinder head.

12. The arrangement of claim 10, wherein said inner surface comprises a stepped configuration with said step defining said smaller diameter.

13. A mounting arrangement for mounting a fuel injector, said arrangement comprising a cylinder head, a sleeve being positioned within said cylinder head, and a fuel injector extending at least partially through said sleeve, said sleeve comprising a flange and a cylindrical portion depending from the flange, said cylindrical portion forming a passage into a combustion chamber, said flange abutting a surface of said cylinder head and the cylindrical portion extending beyond the surface of the cylinder head toward a combustion chamber, and a seal being positioned between said flange and said fuel injector.

14. The arrangement of claim 13, wherein said seal is formed of a flame resistant material.

15. The arrangement of claim 14, wherein said seal is formed of asbestos.

16. The arrangement of claim 13, wherein said fuel injector includes a nozzle, said nozzle extending only part way through said cylindrical portion of said sleeve.

17. The arrangement of claim 16, wherein said sleeve has an inner surface, said inner surface having a portion that defines an opening with a diameter smaller than a diameter of said nozzle.

18. The arrangement of claim 17, wherein said inner surface expands from said smaller diameter toward said combustion chamber.

19. The arrangement of claim 17, wherein said inner surface is stepped such that said smaller diameter portion is one step and a larger diameter portion is positioned between said smaller diameter portion and said larger diameter portion.

20. The arrangement of claim 1, wherein said sealing member is positioned outside of said smaller diameter lower portion.

21. The arrangement of claim 1, wherein said sealing member is not positioned within any portion of said sleeve.

22. The arrangement of claim 1, wherein said sleeve comprises an outwardly extending flange and a cylinder portion, said cylinder portion extending downward from said flange, and said flange rests on said shoulder.

23. The arrangement of claim 22, wherein said sealing member abuts said flange.

24. The arrangement of claim 23, wherein said scaling member is positioned atop said flange such that said flange is interposed between said seal and said shoulder.

25. The arrangement of claim 24, wherein said sealing member rests exclusively on said flange and does not rest on a surface of said mounting bore.

26. The arrangement of claim 1, wherein said shoulder comprises a ring groove formed around an inner periphery of a step in said mounting bore.

27. The arrangement of claim 26, wherein said sleeve comprises a cylinder portion and a flange portion and said flange portion has a thickness generally the same as a depth of said ring groove such that, when said sleeve is positioned within said mounting bore, an upper surface of said flange portion is generally aligned with an upper surface of said step.

28. The arrangement of claim 13, wherein said flange extends outward from said cylindrical portion.

29. The arrangement of claim 28, wherein said cylindrical portion depends from said flange.

30. The arrangement of claim 28, wherein said surface of said cylinder head is a step defined between a larger diameter upper portion of a mounting bore and a smaller diameter lower portion of a mounting bore.

31. The arrangement of claim 30, wherein said step comprises a ring groove formed about an inner periphery of said step and said flange seats within said ring groove.

32. The arrangement of claim 31, wherein an upper surface of said flange and an upper surface of said step are generally aligned with said flange seating within said ring groove.

33. A mounting arrangement for mounting a fuel injector, said arrangement comprising a cylinder head, a sleeve being positioned within said cylinder head, and a fuel injector extending at least partially through said sleeve, said fuel injector comprising a nozzle, said sleeve comprising a flange and an elongated portion, said flange abutting a surface of said cylinder head, a seal being positioned between said flange and said fuel injector and said nozzle of said fuel injector extending only part way through said elongated portion of said sleeve.

34. The arrangement of claim 33, wherein said elongated portion of said sleeve has an inner surface that defines a passageway, said passageway comprising an inner shoulder against which a portion of said nozzle rests.

35. The arrangement of claim 34, wherein said passageway tapers toward said nozzle of said fuel injector from an end disposed away from said nozzle.

36. The arrangement of claim 33, wherein said elongated portion of said sleeve has an inner surface that defines a passageway, an inwardly extending restricting flange being formed along said passageway.

37. The arrangement of claim 36, wherein said nozzle rests on said restricting flange.

38. The arrangement of claim 33, wherein said sleeve has an inner surface, said inner surface having a portion that defines an opening with a diameter smaller than a diameter of said nozzle.

39. The arrangement of claim 36, wherein said inner surface expands from said smaller diameter toward said combustion chamber.

40. The arrangement of claim 36, wherein said inner surface is stepped such that said smaller diameter portion is one step and a larger diameter portion is positioned between said smaller diameter portion and said larger diameter portion.

41. The arrangement of claim 33, wherein said seal is formed of a flame resistant material.

42. The arrangement of claim 41, wherein said seal is formed of asbestos.

43. A mounting arrangement for mounting a fuel injector, said arrangement comprising a cylinder head, a sleeve being positioned within said cylinder head, and a fuel injector extending at least partially through said sleeve, said fuel injector comprising a nozzle, said sleeve comprising a flange and an elongated portion, said flange abutting a surface of said cylinder head, a seal being positioned between said flange and said fuel injector and said seal not being positioned within said sleeve.

44. The arrangement of claim 43, wherein said elongated portion of said sleeve has an inner surface that defines a passageway, said passageway comprising an inner shoulder against which a portion of said nozzle rests.

45. The arrangement of claim 44, wherein said passageway tapers toward said nozzle of said fuel injector from an end disposed away from said nozzle.

46. The arrangement of claim 43, wherein said elongated portion of said sleeve has an inner surface that defines a passageway, an inwardly extending restricting flange being formed along said passageway.

47. The arrangement of claim 46, wherein said nozzle rests on said restricting flange.

48. The arrangement of claim 43, wherein said sleeve has an inner surface, said inner surface having a portion that defines an opening with a diameter smaller than a diameter of said nozzle.

49. The arrangement of claim 48, wherein said inner surface expands from said smaller diameter toward said combustion chamber.

50. The arrangement of claim 48, wherein said inner surface is stepped such that said smaller diameter portion is one step and a larger diameter portion is positioned between said smaller diameter portion and said larger diameter portion.

51. The arrangement of claim 43, wherein said seal is formed of a flame resistant material.

52. The arrangement of claim 51, wherein said seal is formed of asbestos.

53. The arrangement of claim 43, wherein said nozzle of said fuel injector extends only part way through said elongated portion of said sleeve.

\* \* \* \* \*

UNITED STATES PATENT AND TRADEMARK OFFICE
CERTIFICATE OF CORRECTION

PATENT NO.   : 6,295,969 B1
DATED        : October 2, 2001
INVENTOR(S)  : Masahiko Kato and Takayuki Sato It is certified that error appears in the above-identified patent and that said Letters Patent is hereby corrected as shown below:

<u>Column 14,</u>
Line 34, "scaling" should be -- sealing --

Signed and Sealed this

Fourth Day of March, 2003

JAMES E. ROGAN
*Director of the United States Patent and Trademark Office*